Nov. 24, 1942.  G. W. CRISE ET AL  2,302,745
HEATING SYSTEM CONTROL
Original Filed March 28, 1936
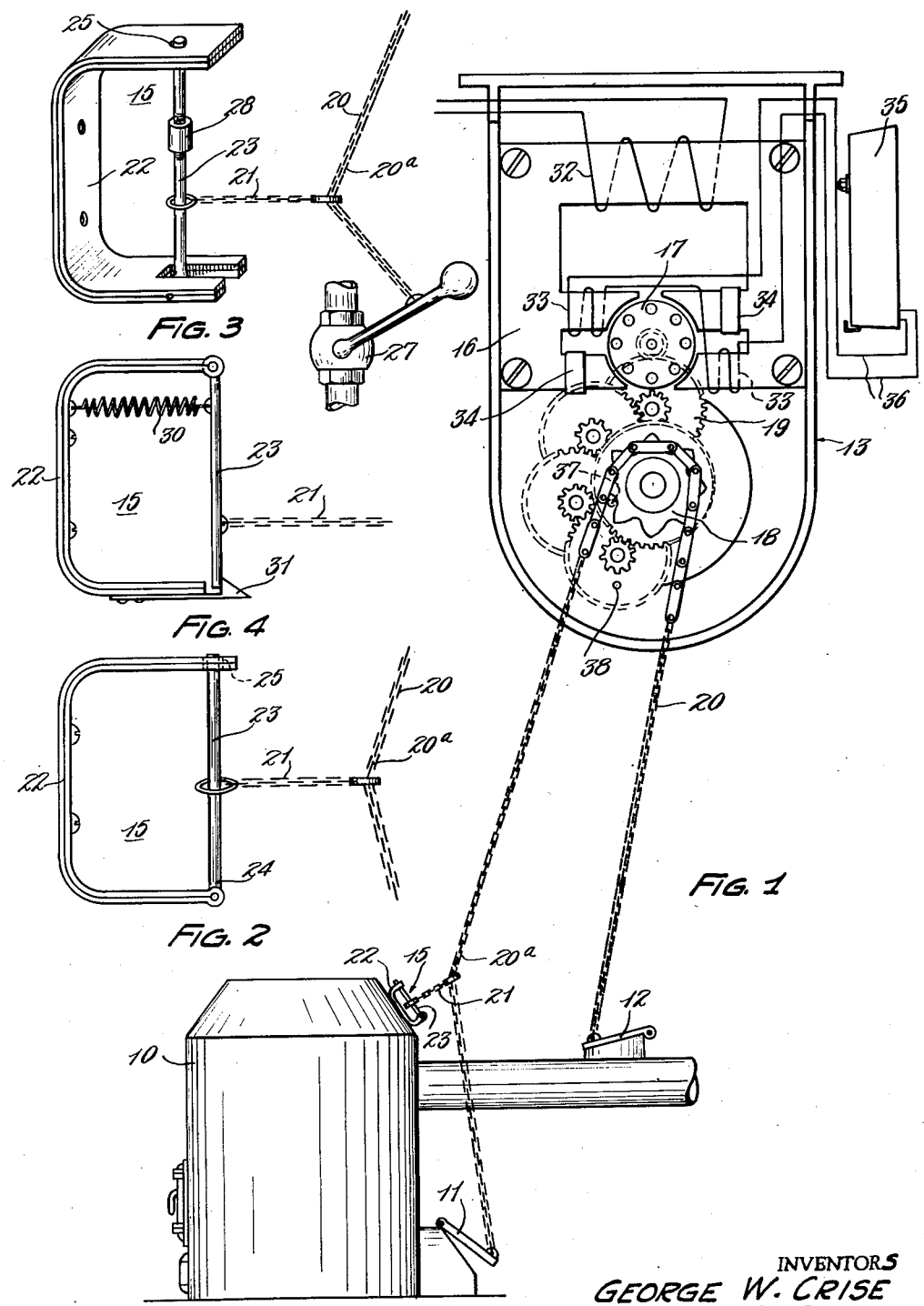
INVENTORS
GEORGE W. CRISE
WILFORD P. CRISE
BY Kwis Hudson & Kent
ATTORNEYS Patented Nov. 24, 1942

2,302,745

UNITED STATES PATENT OFFICE 2,302,745

HEATING SYSTEM CONTROL

George W. Crise and Wilford P. Crise, Columbus, Ohio, assignors to Crise Electric Manufacturing Company, Columbus, Ohio, a corporation of Ohio Original application March 28, 1936, Serial No. 71,410. Divided and this application January 8, 1941, Serial No. 373,628

4 Claims. (Cl. 236—9)

This invention relates to heating systems, and more particularly to improved means for automatically controlling the operation of such systems.

This application is a division of our earlier application, Serial No. 71,410, filed March 28, 1936 now Patent No. 2,230,612, issued Feb. 4, 1941.

An object of our invention is to provide improved control apparatus by which automatic operation of a heating system, or of a movable control member embodied in such system such as a draft door, valve or other member, can be reliably obtained in response to a predetermined temperature change.

Another object of our invention is to provide improved control apparatus for a heating system embodying a furnace having a movable control member, in which the actuating means for such movable control member includes a temperature responsive safety or trip device located on or adjacent the furnace.

A further object of our invention is to provide improved heating system control means of the character just mentioned in which the movable control member is a draft door or valve adapted to be closed upon slackening of an actuating chain, or the like, connected with such door or valve and in which a safety device mounted on or adjacent the furnace automatically causes such slackening of the chain upon predetermined increase in furnace temperature.

Still another object of our invention is to provide a novel temperature responsive safety device suitable for use in the control of heating apparatus and for other purposes, and in which flexing of a bimetallic portion of such device in response to predetermined temperature change, causes the automatic release of a mechanically held trip member.

Our invention may be further briefly summarized as consisting in certain novel combinations and arrangements of parts hereinafter described and particularly set out in the appended claims.

In the accompanying sheet of drawings,

Fig. 1 is an elevational view, somewhat diagrammatic in form, showing a heating system having our improved control means embodied therein;

Fig. 2 is a detached elevational view showing our novel temperature responsive safety device;

Fig. 3 is a similar detached elevational view showing a modified form of our safety device; and Fig. 4 is a detached view, partly in perspective, showing still another form of our safety device as well as a different use or application of such device.

Referring further to the drawing for a more detailed description of our improved heating system control and safety device, we shown in Fig. 1 a furnace 10 equipped with a draft door 11 and a check damper 12. We also show a thermostatically controlled power device 13 for automatically operating the draft door and check damper in response to predetermined changes in the temperature of the room being heated by the furnace 10. The control means which we provide for the furnace 10 also includes a mechanical safety device 15 located on or adjacent the furnace and adapted to cause actuation of a movable furnace control member, in this instance closing of the draft door 11, when the temperature of the furnace exceeds a predetermined value.

As shown in Fig. 1, the power device 13 may comprise an electric motor 16 having its rotor 17 drivingly connected with a sprocket 18 through a suitable gear train 19. A chain 20, or like flexible strand, extends over the sprocket 18 and has its opposite ends connected respectively with the draft door 11 and the check damper 12. The chain 20 is connected with the draft door 11 with sufficient slack to form a bight or loop portion 20a adjacent the safety device 15 and which is connected with the safety device by the short length of the chain 21. The purpose of the bight or loop section 20a in the chain 20 is to permit the chain to be slackened upon functioning of the safety device 15 to thereby close the draft door 11 in the event that the temperature of the furnace reaches a predetermined value.

As indicated above the safety device 15 (shown more in detail in Fig. 2) may be used to close the draft door 11 in case the furnace 10 should become overheated due to failure of other regulating equipment. It comprises the U-shaped bimetallic frame 22 as shown to which is hinged or fulcrumed the trip member or pin 23 at its lower end 24 and to which pin is attached the short chain section 21 that in turn holds the slack out of the drive chain 20. Since the upper end of the pin 23 is held in place by passing through an opening 25 in the upper end of the bimetallic frame 22 (for convenience the opening 25 could be cut through the side of the bimetal frame 22 to form a notch for reclosing the pin 23) it will be obvious that when the temperature of the furnace reaches a dangerously high predetermined temperature the frame member 22 will be spread open, thereby releasing pin 23 and closing the draft door 11.

In Fig. 3 we have shown the safety device 15 arranged to close a valve 27 which may be used to supply fuel to the furnace 10. Of course, such a valve may be used to convey steam, hot or cold water or the like and any suitable type of regulating elements may be used and operated in this manner. 28 indicates a turnbuckle or the like which serves to increase or decrease the length of the pin to cause the release of the same at a different selectable temperature.

In Fig. 4 we have shown a modification of the device shown in Fig. 2, whereby it will reset itself whenever the load is taken off of the chain section 21. For example, if the device shown in Fig. 4 is used in Fig. 1 it would relatch whenever the chain 20 becomes slackened by sufficient counterclockwise rotation of sprocket wheel 18. The spring 30 should be of sufficient strength to relatch the pin 23 under the slight resistance of the latch member 31 when the chain 20 is slack, however, latch 31 is so placed under the lower arm of frame member 22 that it is forced clear of the lower end of pin 23 when the said frame member is expanded by heat, it being apparent that a reasonable weight, such as the load of the draft door 11 shown in Fig. 1, will be sufficient to swing open the pin 23 against the pull of the spring 30 when the latch 31 is released by spreading of the bimetallic frame member 22 thereby closing the damper.

The electric motor 16 embodied in the power device 13 may be of any appropriate type or construction, but in this instance is a motor of the shaded-pole type having a field coil 32 and pairs of shading coils 33 and 34. The shading coils 34 may be closed or short-circuited rings. The coils 33 may be wound coils of a greater shading value and which, when energized, overbalance the short-circuited coils 34. The energization of the wound shading coils 33 may be controlled by a room thermostat 35 having its contacts connected in series with such coils by the conductors 36. When the contacts of the thermostat are opened due to a drop in room temperature, the coils 33 are deenergized and the motor runs in a counterclockwise direction under the influence of the shading coils 34 to cause the draft door 11 to be opened. When the contacts of the thermostat are closed the coils 33 are energized and the motor then runs in a clockwise direction to cause the draft door 11 to be closed. The motor 16 is automatically stopped after rotation sufficient to open or close the draft door 11, this being accomplished in this instance by stop pins 37 and 38 mounted on two different gears of the train 19 so as to engage each other and stall the motor.

From the foregoing description and the accompanying drawing, it will now be readily understood that we have provided improved control means for a heating system, in which a safety device having a mechanical trip pin is located on or adjacent the furnace of the system and is adapted to respond to a predetermined temperature increase to cause a desired movement of a control member. When this device is applied to the operating means for the draft door or fuel valve of a furnace, as in the arrangements herein disclosed, it serves to check combustion in the furnace when the temperature exceeds a predetermined safe value.

Having thus described our invention, we claim:

1. In combination with a furnace having a movable control member, a chain or the like connected with said control member, motor driven means operable to tauten said chain for moving said control member in one direction and to slacken said chain to permit movement of said control member in the opposite direction, a room thermostat connected with said motor driven means to control the same in response to variations in room temperature, and a temperature responsive device mounted at said furnace and having a bight of said chain connected therewith and operating to release said bight and slacken the chain upon predetermined increase in furnace temperature, said device comprising a substantially U-shaped body of bimetallic material mounted on said furnace and a trip member for said chain fulcrumed on one of the arms of said body and releasably latched to the other arm.

2. In a heating system embodying a furnace having a movable control member, an actuating means for said control member including a temperature responsive device mounted at the furnace and comprising a substantially U-shaped frame having spaced arms and a trip member fulcrumed on one arm and having releasable locking engagement with the other arm, at least a portion of said frame being of bimetallic form and adapted to be flexed to release the trip member when the temperature of the furnace exceeds a predetermined value.

3. In a heating system embodying a furnace having a movable control member, an actuating means for said control member including a temperature responsive device mounted at the furnace and comprising a substantially U-shaped body and a trip member fulcrumed on one arm of said body and releasably latched to the other arm, said U-shaped body being of bimetallic form and adapted to be flexed to increase the spacing of its arms to release the trip member when the temperature of the furnace exceeds a predetermined value.

4. In a heating system embodying a furnace having a movable control member, an actuating means for said control member including a temperature responsive device mounted at the furnace and comprising a substantially U-shaped body and a trip member fulcrumed on one arm of said body and releasably latched to the other arm, said U-shaped body being of bimetallic form and adapted to be flexed to increase the spacing of its arms to release the trip member when the temperature of the furnace exceeds a predetermined value, said trip member comprising two sections connected by a threaded sleeve which is adjustable for varying the length of said trip member to regulate the tripping temperature of the device.

GEORGE W. CRISE.
WILFORD P. CRISE.